(12) United States Patent
Kim et al.

(10) Patent No.: US 11,132,911 B2
(45) Date of Patent: Sep. 28, 2021

(54) METHODS, SYSTEMS, AND COMPUTER READABLE MEDIA FOR PROVIDING WORD LEARNING

(71) Applicant: NAVER Corporation, Seongnam-si (KR)

(72) Inventors: Ryan Kim, Seongnam-si (KR); Dong-Hoon Han, Seongnam-si (KR); Jonghwan Kim, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 608 days.

(21) Appl. No.: 15/722,559

(22) Filed: Oct. 2, 2017

(65) Prior Publication Data

US 2018/0025657 A1    Jan. 25, 2018

Related U.S. Application Data

(63) Continuation of application No. PCT/KR2016/003171, filed on Mar. 29, 2016.

(30) Foreign Application Priority Data

Apr. 3, 2015   (KR) .................. 10-2015-0047650

(51) Int. Cl.
*G09B 5/06* (2006.01)
*G09B 19/06* (2006.01)
(Continued)

(52) U.S. Cl.
CPC ............. *G09B 5/06* (2013.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS 4,611,995 A   9/1986 Sado

FOREIGN PATENT DOCUMENTS

JP    2002-366018 A    12/2002
KR    2008-0100857 A    11/2008
(Continued)

OTHER PUBLICATIONS

Taesis, "English Vocabulary Extractor: Smart push Vocabulary list," Naver blog, http://blog.naver.com/taesis/20172738536, Dec. 4, 2012.
(Continued)

*Primary Examiner* — James B Hull
(74) *Attorney, Agent, or Firm* — Harness, Dickey & Pierce, P.L.C.

(57) ABSTRACT

A method performed using at least one processor to facilitate word learning, the method including selecting a plurality of words to be learned; generating a learning word pool including the plurality of words to be learned; selecting a determined number of words from the learning word pool; generating a learning list including the determined number of words; displaying a first word included in the learning list; receiving a selection of whether to maintain the displayed first word in the learning list or replace the displayed first word with an alternate word; excluding the displayed first word from the learning list in response to the selection to replace the displayed first word; and adding the alternate word to the learning list in response to the excluding.

17 Claims, 8 Drawing Sheets

(51) Int. Cl.
*G09B 19/04* (2006.01)
*G06F 3/0482* (2013.01)
*G06F 3/0481* (2013.01)
*G06K 9/62* (2006.01)
*G06Q 50/20* (2012.01)

(52) U.S. Cl.
CPC ......... *G06K 9/6255* (2013.01); *G06K 9/6256* (2013.01); *G09B 19/04* (2013.01); *G09B 19/06* (2013.01); *G06Q 50/20* (2013.01)

(56) References Cited

FOREIGN PATENT DOCUMENTS

| KR | 2010-0138240 A | 12/2010 |
| KR | 2011-0058016 A | 6/2011 |
| KR | 2012-0006720 A | 1/2012 |
| KR | 2013-0011875 A | 1/2013 |

OTHER PUBLICATIONS

International Search Report of PCT/KR2016/003171 Published Jul. 6, 2017.

FIG. 4
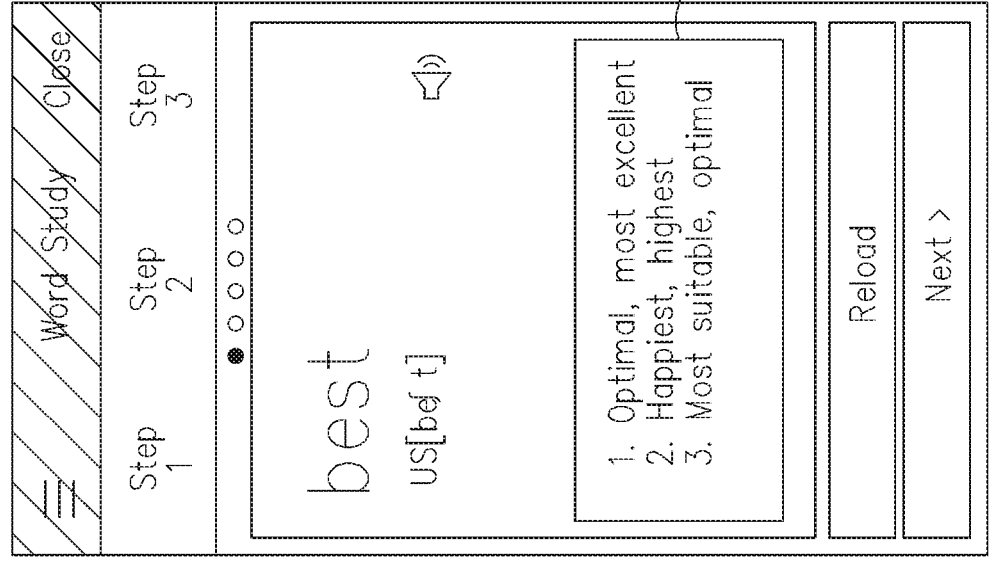
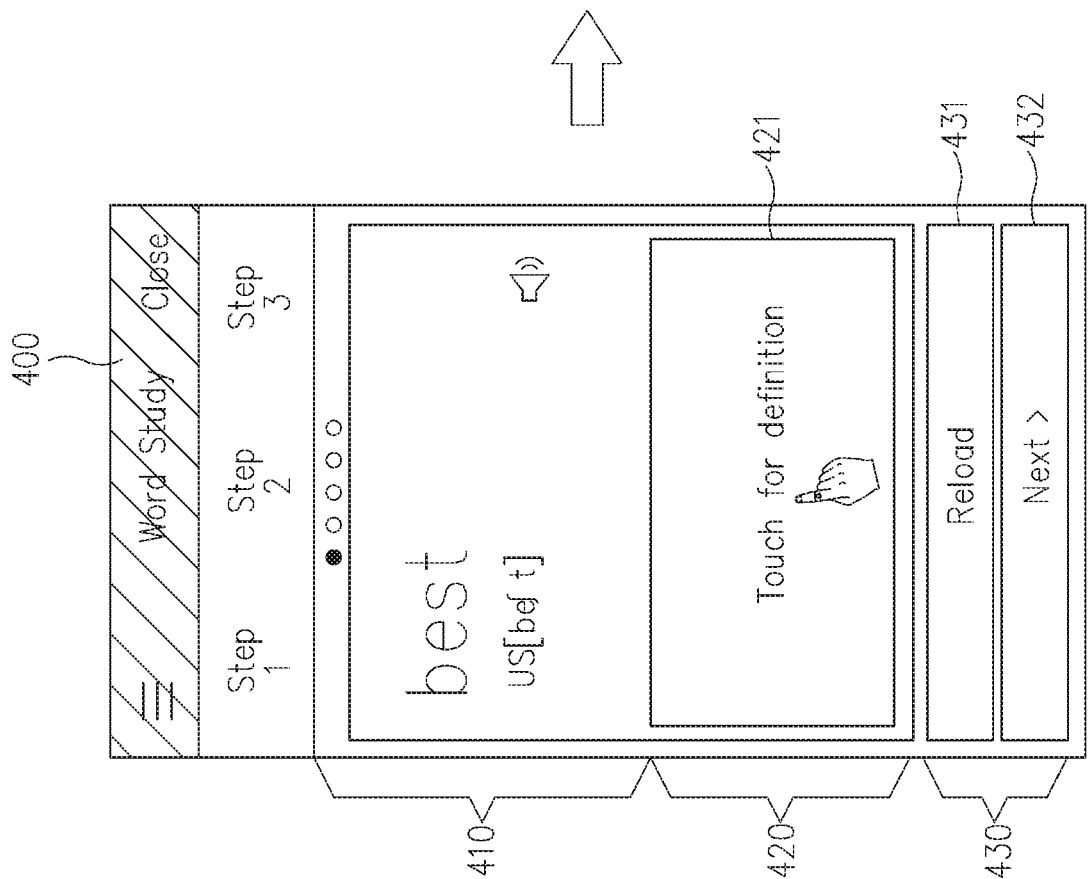

METHODS, SYSTEMS, AND COMPUTER READABLE MEDIA FOR PROVIDING WORD LEARNING

CROSS-REFERENCE TO RELATED APPLICATION

This application is a Continuation of PCT International Application No. PCT/KR2016/003171 which has an International filing date of Mar. 29, 2016, which claims priority to Korean Patent Application No. 10-2015-0047650 filed on Apr. 3, 2015, the contents of both of which are hereby incorporated by reference in their entireties.

BACKGROUND

Technical Field

Some example embodiments relate to technology for providing word learning in a portable terminal.

Related Art

Although the functionality of mobile communication terminals released at an initial stage was limited to that of a portable phone, mobile communication terminals released in the recent times have various multimedia functions, for example, involving the use of MP3s and wireless Internet, beyond a simple telephone call function.

Many additional services, for example, mobile games, wireless Internet, etc., may use such multimedia functions of mobile communication terminals.

Many mobile communication terminals may connect to a wireless Internet service using a wireless Internet browser, for example, a wireless application protocol (WAP) browser, a mobile equipment (ME) browser, and the like, and may search for a variety of information without time and place restrictions using a wireless Internet platform, for example, general virtual machine (GVM), binary runtime environment for wireless (BREW), JAVA, and the like.

SUMMARY

One or more example embodiments provide methods, systems and computer readable media for replacing a word to be learned with another word in a learning list that is separately managed for learning, such as word memorization, understanding of technical terms, and the like, and automatically updating the learning list.

One or more example embodiments also provide methods, systems and computer readable media for providing an opportunity capable of learning again a word to be memorized that is excluded from a learning list using a push notification function although the word to be memorized is excluded from the learning list.

According to an aspect of at least one example embodiment, there is provided a method to facilitate word learning, the method includes selecting, using at least one processor, a plurality of words to be learned. The method further includes generating, using the at least one processor, a learning word pool including the plurality of words to be learned. The method further includes selecting, using the at least one processor, a determined number of words from the learning word pool. The method further includes generating, using the at least one processor, a learning list including the determined number of words. The method further includes displaying, using the at least one processor, a first word included in the learning list. The method further includes receiving, using the at least one processor, a selection of whether to maintain the displayed first word in the learning list or replace the displayed first word with an alternate word. The method further includes excluding, using the at least one processor, the displayed first word from the learning list in response to the selection to replace the displayed first word. Furthermore the method includes adding, using the at least one processor, the alternate word to the learning list in response to the excluding.

According to an aspect of at least one example embodiment, there is provided a non-transitory computer-readable medium including instructions to control a computer system to facilitate word learning, wherein the instructions cause the computer system to perform a method that includes selecting a plurality of words to be learned. The method further includes generating a learning word pool including the plurality of words to be learned. The method further includes selecting a determined number of words among the learning word pool. The method further includes generating a learning list including the determined number of words. The method further includes displaying a word included in the learning list. The method further includes receiving a selection of whether to maintain the displayed word in the learning list or replace the displayed word with an alternate word. The method further includes excluding the displayed word from the learning list in response to the selection to replace the displayed word. Furthermore, the method includes adding the alternate word to the learning list in response to the excluding.

According to an aspect of at least one example embodiment, there is provided a system for facilitating word learning that includes a learning word pool generator configured to select a plurality of words to be learned, and generate a learning word pool including the plurality of words to be learned. The system further includes a learning list generator configured to select a determined number of words from the learning word pool, and generate a learning list including the determined number of words. The system further includes a provider configured to display a first word included in the learning list. Furthermore, the system includes a learning list manager configured to receive a selection of whether to maintain the displayed first word in the learning list or replace the displayed first word with an alternate word, exclude the displayed first word from the learning list in response to the selection to replace the displayed first word, and add the alternate word to the learning list in response to the exclusion of the displayed first word.

According to some example embodiments, by replacing a word to be learned included in a learning list that is separately managed for learning with another word included in a learning word pool, it is possible to automatically update the learning list and to simplify a management of the learning list. In addition, it is possible to induce a user to learn many words.

BRIEF DESCRIPTION OF DRAWINGS

FIG. 4 illustrates a process of providing a word to be learned included in a learning list according to at least one example embodiment.

DETAILED DESCRIPTION

Some example embodiments relate to technology for providing a wordbook service, and more particularly, to technology for determining whether to replace a word to be learned with another word or to maintain the word to be learned in a learning list that is separately managed for learning, and automatically updating and managing the learning list. In detail, the wordbook service may be provided based on pre-downloaded dictionary information and the dictionary information may include a spelling (headword), a pronunciation symbol, voice data of pronunciation, an example sentence, a translation of the example sentence, etc., for each word.

Herein, the term "wordbook service" is to provide a word and a meaning of the word for word memorizing and learning, etc., and may indicate a service capable of storing, reading, editing, and printing words, idioms, example sentences, and the like, in a dictionary.

Herein, the term "push notification list" is a list that includes words of which a user may be reminded. Words retrieved by a user from a dictionary and words to be memorized among words included in a wordbook list and a learning word pool may be included in the push notification list.

Herein, the term "wordbook list" is a list that includes idioms and words retrieved by the user from the dictionary, and may be stored in a portable terminal and provided to the user offline.

Herein, the term "learning word pool" is a list that includes words selected by the user for learning, and may include words that are selected for learning, such as memorization, from, for example, the wordbook list, the push notification list, the dictionary, and the like. For example, the learning word pool may include 100, 1000, etc., words to be continuously learned during a long period of time.

Herein, the term "learning list" is a list that includes words to be memorized during a short period of time that are extracted from among the words to be learned, and may include a determined number of words that are selected from the learning word pool. For example, the learning list is a list that includes words to be memorized while moving using a transportation system, during a rest time, and the like, and may include five words, ten words, 20 words, etc., selected from among words to be learned included in the learning word pool. Here, the learning list may include a determined number of words that are selected from the wordbook list, the push notification list, the dictionary, etc., in addition to the learning word pool.

Hereinafter, some example embodiments are described with reference to the accompanying drawings.

Figure 1:
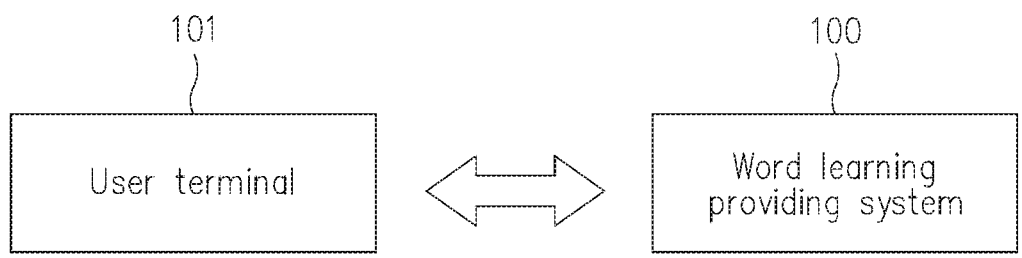
FIG. 1 is a diagram illustrating a relationship between a word learning providing system and a user terminal according to at least one example embodiment.

FIG. 1 is a diagram illustrating a relationship between a word learning providing system and a user terminal according to at least one example embodiment. FIG. 1 illustrates a user terminal 101 and a word learning providing system 100. In FIG. 1, an indicator with arrowheads may indicate that data may be transmitted and received between the user terminal 101 and the word learning providing system 100 over a wireless network.

The user terminal 101 may be, for example, a personal computer (PC), a smartphone, a tablet, a wearable computer, and the like, and may indicate any type of terminal devices capable of connecting to a website/mobile site associated with the word learning providing system 100, and installing and executing a service exclusive application (hereinafter, referred to as a "wordbook app"). Here, the user terminal 101 may perform an overall service operation, such as a service screen configuration, a data input, a data transmission and reception, a data storage, and the like, under control of the website/mobile site or the exclusive application.

The word learning providing system 100 serves as a service platform to provide a wordbook service to a client. In particular, the word learning providing system 100 may be configured as an application form on the user terminal 101. This is merely provided as an example and the word learning providing system 100 may be configured to be included in a service platform that provides the wordbook service in a client-server environment. In particular, the word learning providing system 100 may provide a function of replacing, for example, reloading, words to be learned with other words for wordbook learning.

Hereinafter, a service environment through the wordbook app is described in detail. However, it is provided only as an example and without being limited thereto, the wordbook service according to some example embodiments may be configured in a connection environment of the website/mobile site.

Figure 2:
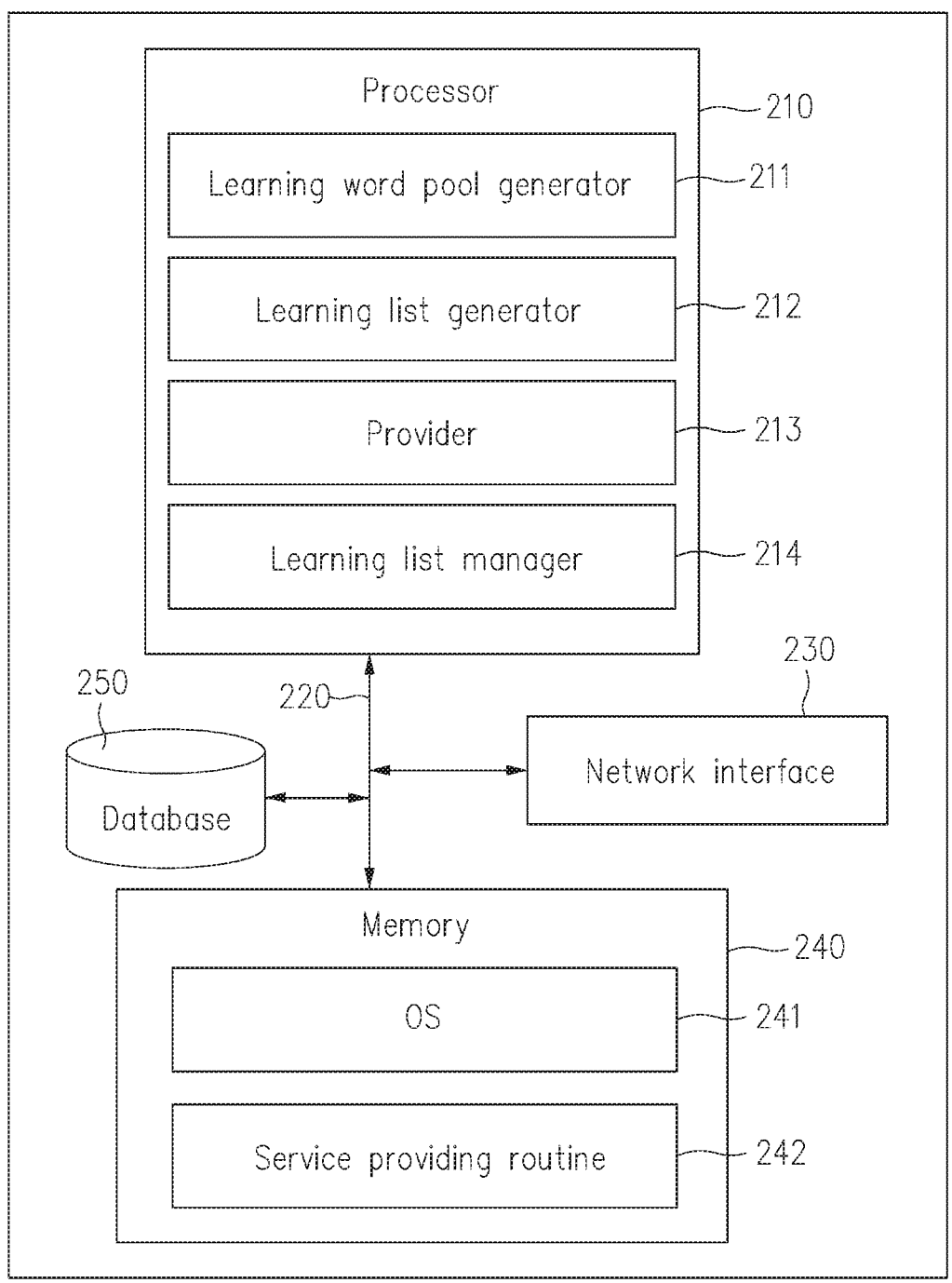
FIG. 2 is a block diagram illustrating a configuration of a word learning providing system according to at least one example embodiment.
Figure 3:
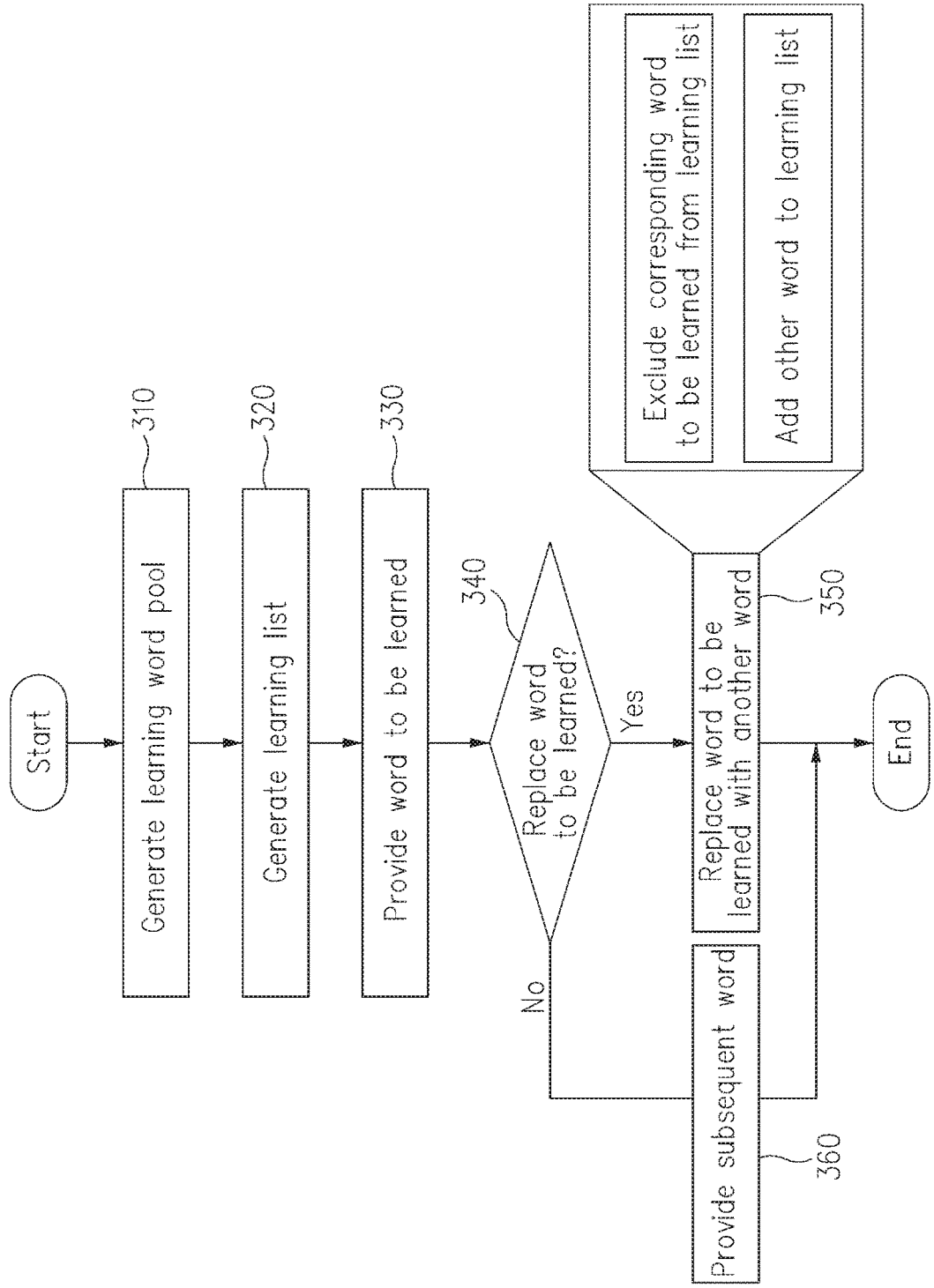
FIG. 3 is a flowchart illustrating a word learning providing method according to at least one example embodiment.

FIG. 2 is a block diagram illustrating a configuration of a word learning providing system according to at least one example embodiment, and FIG. 3 is a flowchart illustrating a word learning providing method according to at least one example embodiment.

Referring to FIG. 2, a word learning providing system 200 may include at least one processor 210 (hereinafter referred to in the singular form), a bus 220, a network interface 230, a memory 240, and a database 250. The memory 240 may include an operating system (OS) 241 and a service providing routine 242. The processor 210 may include a learning word pool generator 211, a learning list generator 212, a provider 213, and a learning list manager 214. According to other example embodiments, the word learning providing system 200 may include more components than the components shown in FIG. 2. Alternatively, a portion of the components may be omitted.

The memory 240 may include a permanent mass storage device, such as random access memory (RAM), read only memory (ROM), a hard disk drive, an optical drive, a solid state drive, etc., as a non-transitory computer-readable recording medium. Also, a program code for the service providing routine 242 and the OS 241 may be stored on the memory 240. Such software components may be loaded from another computer-readable recording medium separate from the memory 240 using a drive mechanism (not shown). The other computer-readable recording medium may include, for example, a floppy drive, a disk, a tape, a DVD/CD-ROM drive, a memory card, and the like. According to other example embodiments, software components may be loaded to the memory 240 through the network interface 230 instead of using the computer-readable recording medium.

The bus 220 may enable communication and data transmission between components of the word learning providing system 200. The bus 220 may be configured using a high-speed serial bus, a parallel bus, a storage area network (SAN) and/or another appropriate communication technique.

The network interface 230 may be a computer hardware component for connecting the word learning providing system 200 to a computer network. The network interface 230 may connect the word learning providing system 200 to the computer network through a wireless or wired connection.

The database 250 is configured by the wordbook app and serves to download basic dictionary information from an online database system and to store and maintain the downloaded basic dictionary information as a wordbook. For example, the database 250 may be used to provide a wordbook function in an offline local environment. Here, the basic dictionary information may include a spelling (headword), a pronunciation symbol, voice data of pronunciation, at least a portion of meanings, at least a portion of example sentences, a translation of a corresponding example sentence, etc., for each word. For example, at least a portion of meanings may be limited to a primary meaning including 20 or fewer letters among a plurality of meanings of a word in a dictionary. At least a portion of example sentences may be limited to a single representative example sentence among a plurality of example sentences of the corresponding word registered to the dictionary. Each word may include information regarding whether an example sentence and a translation of the example sentence are present. That is, words in the dictionary may be classified into a word of which an example sentence is absent, a word of which an example sentence is present and of which a translation of the example sentence is absent, and a word of which an example sentence and a translation of the example sentence are present. The basic dictionary information may be collectively downloaded from a dictionary database system. Some dictionary information, for example, an example sentence, a translation of the example sentence, etc., may be downloaded at a specific point in time, for example, at a point in time at which a user connects to the wordbook list. Information about a difficulty level, for example, difficult/medium/easy, classified in the dictionary may be included in each word.

Words included in the wordbook list may be classified into a memorized word and a word to be memorized based on user set information regarding whether a corresponding word is memorized. The database 250 may store a push notification list that includes words to be memorized. The database 250 may store a learning word pool that includes words to be learned selected by the user for learning such as memorization, etc., and may store a learning list that includes words selected from the learning word pool for short-term learning.

Here, the word learning providing system 200 may support a cloud-based wordbook service through synchronization of the database 250. That is, once the user is logged into a user account and a synchronization is set by the user, the synchronization of the database 250 may be performed through matching to user information of the database 250. In this way, words retrieved and stored from another device or PC may be maintained in the same list pool. Accordingly, the word learning providing system 200 may maintain the same word list pool in any device through the synchronized wordbook list of the database 250.

The processor 210 may be configured to process instructions of a computer program by performing basic arithmetic operations, logic operations, and input/output (I/O) operations of the word learning providing system 200. The instructions may be provided from the memory 240 or the network interface 230 to the processor 210 through the bus 220. The processor 210 may be configured to execute a program code for the learning word pool generator 211, the learning list generator 212, the provider 213, and the learning list manager 214. The program code may be stored in a recording device such as the memory 240.

Figure 6:
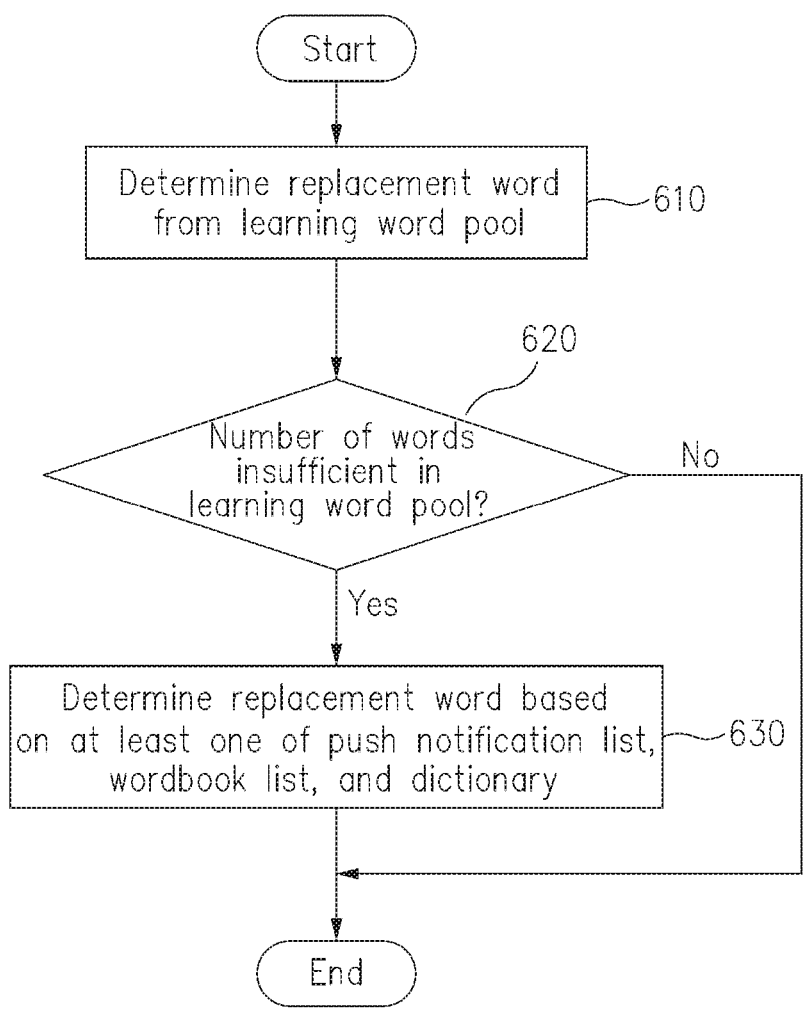
FIG. 6 is a flowchart illustrating an operation of determining a word to replace a word to be learned according to at least one example embodiment.

The learning word pool generator 211, the learning list generator 212, the provider 213, and the learning list manager 214 may be configured to perform operations 310 through 360 of FIG. 3 and operations 610 through 630 of FIG. 6.

Referring to FIG. 3, in operation 310, the learning word pool generator 211 may select words to be learned that are to be memorized and may generate a learning word pool. Here, the learning word pool generator 211 may select a set reference number of words to be learned with respect to words included in a dictionary, a push notification list, and a wordbook list.

For example, the learning word pool generator 211 may select at least a portion of words to be memorized included in the push notification list as words to be learned. As another example, the learning word pool generator 211 may select words to be learned in an order, for example, most recent (hereinafter referred to as latest), in which a corresponding word is recently registered to the wordbook list. As another example, the learning word pool generator 211 may select words to be learned based on a difficulty level in the dictionary and the wordbook list. For example, the learning word pool generator 211 may select words corresponding to a difficulty level requested by the user from among words included in the dictionary and the wordbook list as words to be learned. If a desired difficulty level is not set by the user, the learning word pool generator 211 may select a reference number of words as the words to be learned in order from an easy word corresponding to a low level to a difficulty word corresponding to a high level. For example, if 100 words to be learned are requested with respect to the learning word pool and 20 words corresponding to a level 1 are present, the learning word pool generator 211 may select words to be learned so that a sum of 20 words of level 1, the entire words corresponding to a level 2, the entire words corresponding to a level 3, . . . , and a number of words corresponding to a level n becomes 100. Here, a difficulty level of each word may be classified using a star point and the like.

In addition, the learning word pool generator 211 may select words to be learned by combining at least two selection criteria such as latest, whether to memorize, a difficulty level, etc., and may generate a learning word pool that includes the selected words to be learned. For example, the learning word pool generator 211 may classify words to be memorized into a latest word of an upper level, a latest word of a medium level, and a latest word of a lower level, may select 100 words from the latest word of the lower level to the latest word of the upper level, and may generate the learning word pool based thereon.

The learning word pool generator 211 may update the learning word pool that includes words selected as the words to be learned, at a determined point in time. For example, the learning word pool generator 211 may automatically update the learning word pool at determined periods, for example, every day, every week, etc.

As another example, the learning word pool generator 211 may update the learning word pool at a point in time at which a modification occurs in the push notification list, the wordbook list, and the dictionary. For example, in response to an occurrence of a modification, such as, a registration of a new word to the wordbook list by the user, a correction of a memorized word and/or a word to be memorized in the wordbook list, a registration of a new word to be memorized to the push notification list, an update of dictionary information, and the like, the learning word pool generator 211 may update the learning word pool.

As another example, the learning word pool generator 211 may evaluate a grade of the user based on a learning result of a word to be learned and may update the learning word pool with respect to words of a difficulty level corresponding to the evaluated grade of the user. For example, the learning word pool generator 211 may implement a test with respect to the words to be learned and may evaluate the grade of the user corresponding to a test result based on a set criterion. The learning word pool generator 211 may select a determined number of words from among words of a difficulty level corresponding to a set level of the user as the words to be learned with respect to at least one of words included in the push notification list, the wordbook list, and the dictionary, and may update the learning word pool.

In operation 320, the learning list generator 212 may select a determined number of words to be learned during a short term, such as while moving, during a rest time, etc., from among the words to be learned included in the learning word pool, and may generate a learning list. For example, the learning list generator 212 may randomly select a determined number of words, for example, five words, ten words, etc., from among the words to be learned included in the learning word pool starting with a low level word, and may generate the learning list. As another example, the learning list generator 212 may generate the learning list based on a determined number of words that are selected by the user from among the words to be learned included in the learning word pool. Here, a number of words to be memorized through a learning course may be modified and set by the user. For example, the number of words to be learned included in the learning list may be changed from ten words to five words and thereby set, and may also be changed from ten words to 20 words and thereby set.

In operation 330, the provider 213 may provide a word to be learned included in the learning list. For example, the provider 213 may provide a spelling (headword), a pronunciation symbol, voiced data of pronunciation, at least a portion of meanings, an example sentence, etc., of a corresponding word to be learned. According to some example embodiments, the provider 213 may provide the above information by displaying the information on a display and/or outputting the information through a speaker.

Here, the provider 213 may provide the words to be learned sequentially starting from a first word among words included in the learning list, and may also provide the words to be learned sequentially from a word corresponding to a point in time at which the learning course was previously terminated based on a previous learning history. For example, if a first word is 'best', a second word is 'want', a third word is 'reason', and learning is terminated at 'want' in a previous learning, the provider 213 may provide the words to be learned so that the learning course may start from 'want'. Here, an operation of providing words to be learned is described with reference to FIG. 4.

In operation 340, the learning list manager 214 may receive a selection on whether to replace a word currently being provided to be learned with another word. For example, the learning list manager 214 may display, on a screen of the user terminal, a message asking whether to replace the word to be learned, which is displayed on the screen of the user terminal, with another word included in the learning word pool.

In operation 350, in response to a selection to replace the word to be learned with the other word, the learning list manager 214 may replace the word to be learned included in the learning list with the other word. For example, the learning list manager 214 may determine the other word among the remaining words from among the words included in the learning word pool, excluding words included in the learning list, and may replace the word to be learned with the determined other word. In addition to the learning word pool, the other word may be determined among words included in the wordbook list, the push notification list, the dictionary, and the like. The learning list manager 214 may exclude the word to be learned displayed on the screen from the learning list, and may add the other word to the learning list. The word to be learned may be excluded from the learning list depending on whether the corresponding word is memorized, however, may be still included in the learning word pool. An operation of replacing a word to be learned with another word is further described with reference to FIG. 5.

In operation 360, in response to a selection to not replace the word to be learned with the other word, the learning list manager 214 may provide a subsequent word corresponding to an order of the words to be learned included in the learning list (hereinafter referred to as a subsequent order).

For example, each word to be learned may be sorted in level order, in alphabetical order, word length order, a combination thereof (for example, a combination of at least one of a level, an alphabet, and a length), or user designation order, and thereby displayed on the user terminal. For example, if a first word is 'best', a second word is 'want', a third word is 'reason', a currently displaying word to be learned is 'want', and in this instance, no replacement with the other word is selected, the learning list manager 214 may display the word to be learned, 'reason', corresponding to a subsequent order of 'want' on the user terminal.

FIG. 4 illustrates a process of providing a word to be learned included in a learning list according to at least one example embodiment.

Referring to FIG. 4, display information (reload) 431 may be used to receive a selection on whether to replace a word to be learned included in a learning list with another word or whether to maintain the word to be learned in the learning list.

Referring to FIG. 4, the provider 213 may sequentially provide words to be learned included in the learning list to a user terminal. For example, if a previous learning history is present, the provider 213 may display, on the user terminal, words to be learned sequentially from a word, for example, 'want', corresponding to a point in time at which a previous learning is terminated. If the previous learning history is absent, the provider 213 may provide, that is, display the words to be learned sequentially from a first word, for example, 'best', of the learning list.

A screen 400 of the user terminal may include a first area 410 on which a spelling (headword), a pronunciation symbol, and voice data of a word to be learned, for example, 'best', corresponding to a current order are displayed, a second area 420 on which at least a portion of meanings and example sentences are displayed, and a third area 430 on which display information (reload) 431 is displayed. If an example sentence is absent, the example sentence may not be displayed on the second area 420. A display hide 421 and unhide function 422 using a touch may be set on the second area 420. For example, in response to a touch on the second area in a state (display hide) 421 in which a meaning of the word to be learned is not displayed on the second area 420, a display unhide function may be set so that the meaning of the word to be learned may be displayed on the second area 420. In response to a touch on the second area in a state (unhide function) 422 in which the meaning of the word to be learned is displayed on the second area 420, a display hide function may be set so that the meaning of the word to be learned may not be displayed.

The display information (reload) 431 for replacing the word to be learned with the other word and display information (next) 432 for displaying a subsequent word without replacing the word to be learned with the other word may be displayed on the third area 430. For example, in response to a selection on the display information (reload) 431, the learning list manager 214 may provide a message asking whether the word to be learned has been memorized prior to replacing the word to be learned with the other word. An operation of asking whether a corresponding word to be learned has been memorized and then replacing the word to be learned with another word is further described with reference to FIGS. 5 through 7.

Figure 5:
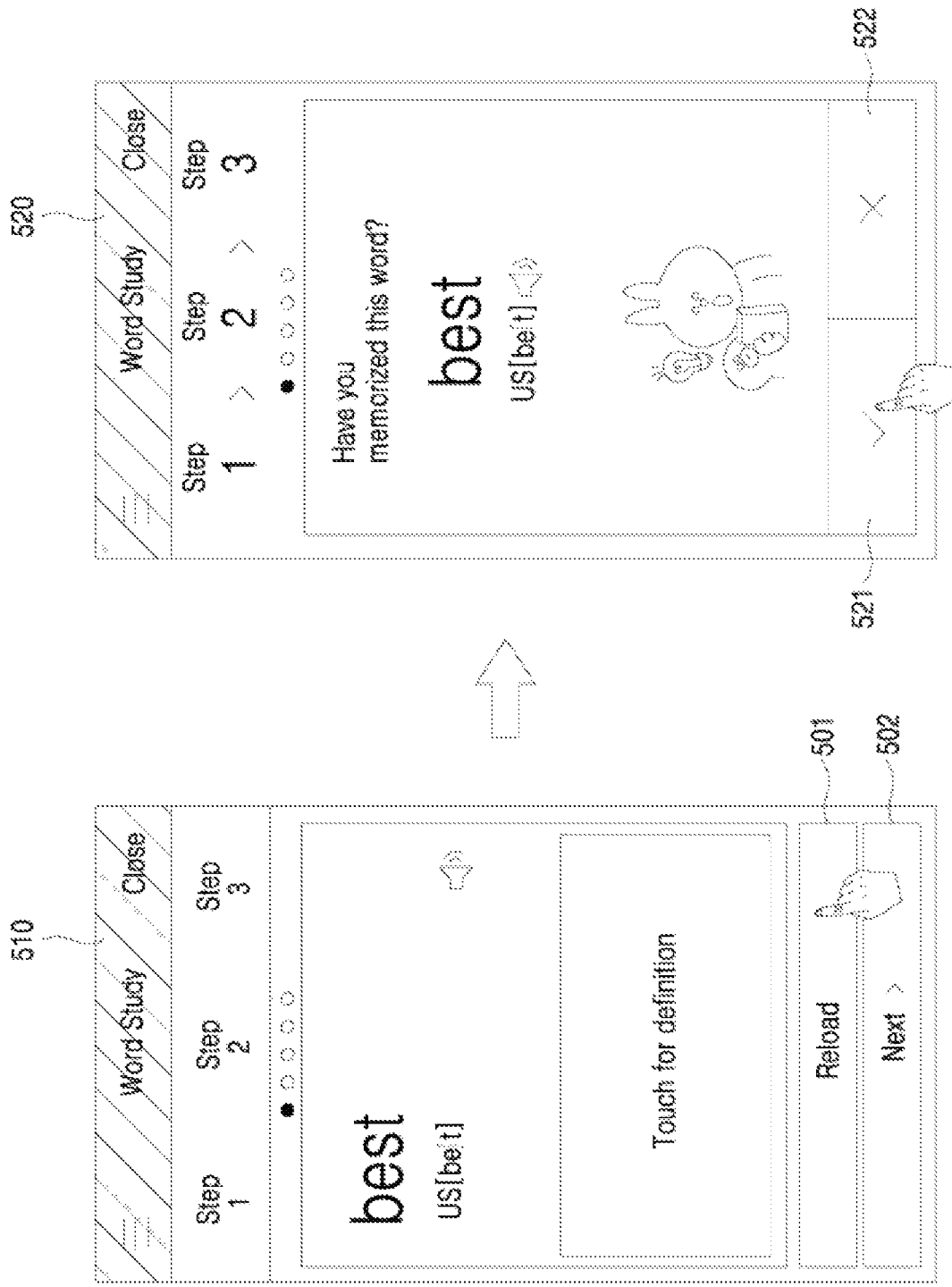
FIG. 5 illustrates a process of asking whether to process that a word to be learned has been memorized according to at least one example embodiment.

FIG. 5 illustrates a process of asking whether to process that a word to be learned has been memorized according to at least one example embodiment.

Referring to FIG. 5, in response to a selection 501 to replace, for example, reload, a word to be learned with another word, the learning list manager 214 may provide a movement from a page 510 for receiving a selection on whether to replace the word to be learned with the other word to a page 520 for receiving a selection on whether the word to be learned has been memorized. For example, the page 520 may be displayed on a user terminal in a popup form. The page 520 may include display information (memorized) 521 for indicating that the word to be learned has been memorized and display information (pass) 522 for indicating that the word to be learned has not been memorized.

In response to a selection of the user on the display information (memorized) 521, the learning list manager 214 may process that the word to be learned, for example, 'best', is memorized, and may exclude the processed word from a learning list. Here, the processing may indicate that the learning list manager 214 excludes the word to be learned, for example, 'best', from the learning list and also from a learning word pool.

In response to a selection of the user on the display information (pass) 522, the learning list manager 214 may process that the word to be learned, for example, 'best', is still to be memorized, and may exclude the processed word from the learning list. Here, the processing may indicate that the learning list manager 214 excludes the word to be learned, for example, 'best', from the learning list and maintains the word to be learned in the learning word pool. Here, if a word to be learned that is processed to be memorized is absent in a push notification list, the learning list manager 214 may add a word to be learned to be memorized to the push notification list. When the user restarts a learning course after a current learning course is terminated, the learning list manager 214 may provide the word to be learned to be memorized to the user terminal using a push notification. Here, in response to a selection on the display information (memorized) 521 or the display information (pass) 522, the learning list manager 214 may display a word corresponding to a subsequent order of a memorized word or a word to be memorized on the user terminal.

As described above, a word learning providing system according to some example embodiments may exclude the word to be memorized from the learning list and may maintain the word to be memorized in the learning word pool. In this manner, the word learning providing system may include again the word to be memorized in the learning list, thereby providing a relearning opportunity.

FIG. 6 is a flowchart illustrating an operation of determining a word to replace a word to be learned according to at least one example embodiment.

In operation 610, in response to a selection on display information (reload) for replacing a word to be learned with another word, the learning list manager 214 may determine the other word (hereinafter, also referred to as a replacement word) to replace the word to be learned from a learning word pool. For example, the learning list manager 214 may determine a word of the same difficulty level as that of a word to be excluded or a word corresponding to a difficulty level requested by a user as the replacement word among words included in the learning word pool. Here, if a plurality of other words corresponds to the same difficulty level, the learning list manager 214 may determine the replacement word by applying a weight to a word having a similar meaning to that of the word to be learned, a word having a search history of the user, or a word corresponding to a combination of a similar word and a search history.

In addition, if a plurality of other words corresponds to the same difficulty level, the learning list manager 214 may sort words corresponding to the same difficulty level in alphabetical order or word length order, and may determine the replacement word in alphabetical order or in descending order of word lengths. A configuration of determining the replacement word by sorting the words in alphabetical order or word length order may be applicable to words to which a weight is applied.

Meanwhile, once words included in a learning list are processed as having been memorized and excluded from all of the learning list and the learning word pool, a number of words corresponding to the same difficulty level as that of the word to be excluded may be insufficient among the words to be learned included in the learning word pool. When a number of words to be learned included in the learning word pool is insufficient in operation 620, the learning list manager 214 may determine the replacement word from at least one of a push notification list, a wordbook list and a dictionary in addition to the learning word pool in operation 630.

For example, the learning list manager 214 may determine the replacement word among words included in the wordbook list based on a latest, a difficulty level, and a combination of the latest and the difficulty level. For example, the learning list manager 214 may determine a word of the same difficulty level as that of the word to be excluded as the replacement word among words recently registered to the wordbook list. If a number of words to replace the word to be learned is insufficient even using the words included in the wordbook list, the learning list manager 214 may determine a word corresponding to the same difficulty level as that of the word to be excluded as the replacement word among words to be memorized that are included in a push notification list. Also, if a number of words to replace the word to be learned is insufficient even using the push notification list, the learning list manager 214 may determine a word corresponding to the same difficulty level as that of the word to be excluded as the replacement word among words included in a dictionary.

In addition, if a number of words corresponding to the same difficulty level as that of the word to be excluded is insufficient among the words included in the learning word pool, the learning list manager 214 may determine a replacement word among words of a difficulty level by one level greater than that of the word to be excluded, and may also determine the replacement word among words of a difficulty level greater than that of the word to be excluded even in at least one of the wordbook list, the push notification list, and the dictionary.

Figure 7:
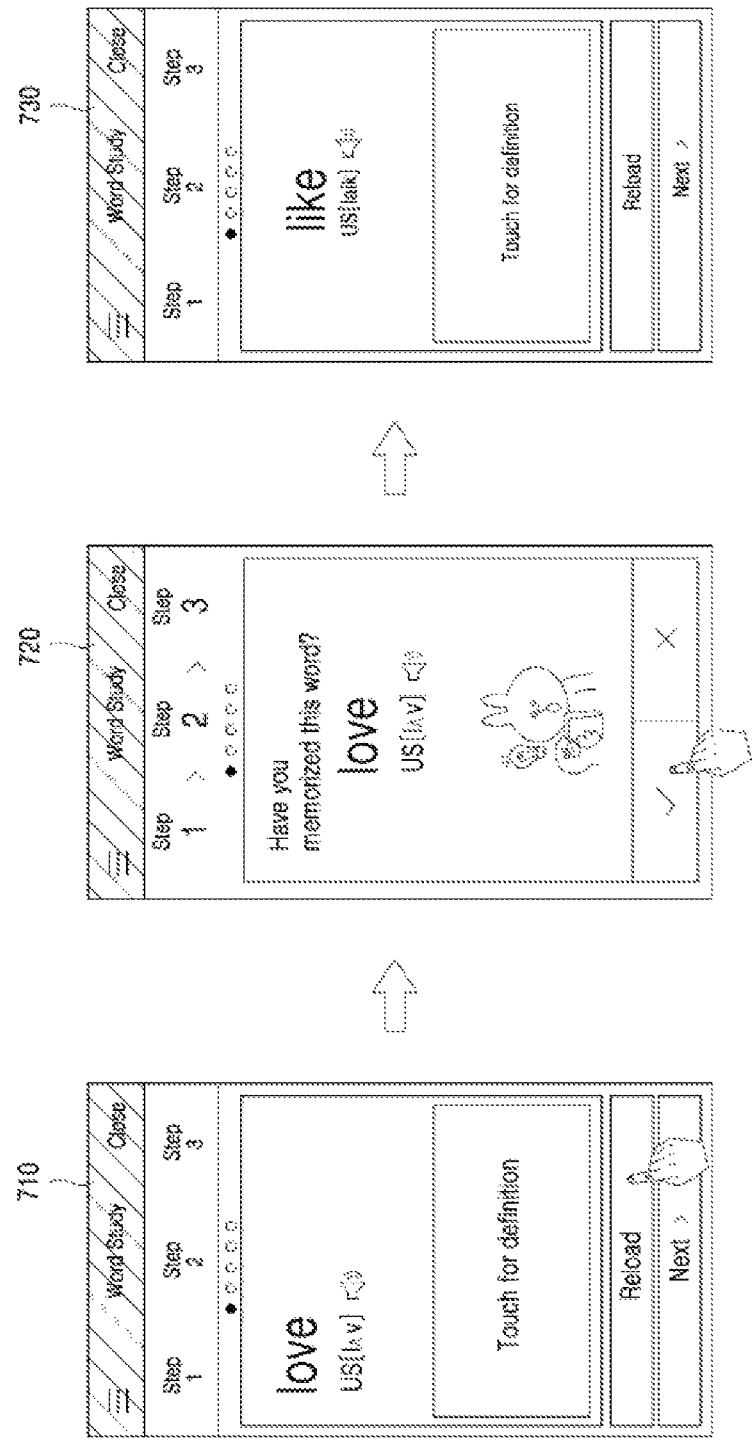
FIG. 7 illustrates an example of a process of replacing a word to be learned with another word and providing a learning course according to at least one example embodiment.

FIG. 7 illustrates an example of a process of replacing a word to be learned with another word and providing a learning course according to at least one example embodiment.

FIG. 7 assumes a case in which five words, 'best', 'want', 'most', 'good', and 'love', are included in a learning list. Description is made with reference to FIGS. 5 and 7.

In response to selecting the display information (reload) 501 of FIG. 5 for replacing a word to be learned in a state in which 'best' is displayed on the screen of the user terminal and then selecting the display information 521 for indicating that 'best' has been memorized or the display information 522 for processing that 'best' is still to be memorized, the learning list manager 214 may exclude 'best' from the learning list and may display 'want' corresponding to a subsequent order of 'best' on the screen of the user terminal. The learning list manager 214 may display a spelling, a pronunciation symbol, voice data, a meaning, etc., of a corresponding word to be learned on the screen of the user terminal in order of 'want', 'most', 'good', and 'love'.

Here, if 'best' is replaced with 'like' and 'like' is included in the learning list, the learning list manager 214 may display 'like' that is a subsequent word replacing 'love' on the screen of the user terminal. Referring to FIG. 7, the learning list manager 214 may move from a learning course page associated with 'love' to a learning course page associated with 'like'. The learning course page associated with 'love' may be, for example, a page 710 for receiving a selection on whether to replace 'love' with another word and a page 720 for receiving a selection on whether 'love' has been memorized, and the learning course page associated with 'like' may be, for example, a page 730 for receiving a selection on whether to replace 'like' with another word. As described above, the learning list manager 214 may provide a sequential page movement so that five words to be learned, 'like', 'want', 'most', 'good', and 'love', included in the learning list may be iteratively learned.

Likewise, if 'best' is maintained in the learning list instead of being replaced with another word in response to a selection on display information (next) 502 of FIG. 5, the learning list manager 214 may provide a sequential page movement so that five words to be learned, 'best', 'want', 'most', 'good', and 'love', included in the learning list may be iteratively learned.

Figure 8:
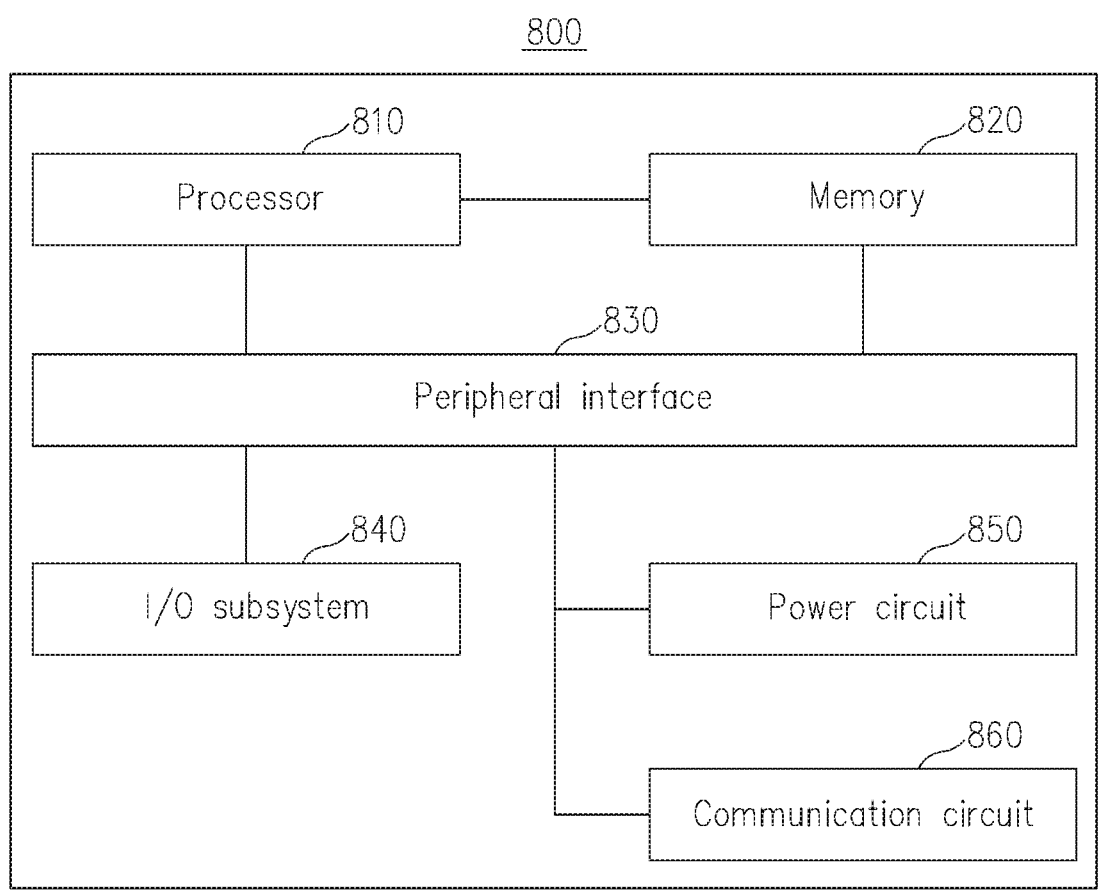
FIG. 8 is a block diagram illustrating a configuration of a computer system according to at least one example embodiment.

FIG. 8 is a block diagram illustrating an example of a configuration of a computer system according to at least one example embodiment. Referring to FIG. 8, a computer system 800 may include at least one processor 810, a memory 820, a peripheral interface 830, an I/O subsystem 840, a power circuit 850, and a communication circuit 860. Here, the computer system 800 may correspond to a user terminal.

The memory 820 may include, for example, high-speed random access memory (HSRAM), a magnetic disk, static random access memory (SRAM), dynamic RAM (DRAM), ROM, a flash memory, a non-volatile memory, etc. The memory 820 may include a software module, an instruction set, or a variety of data, used during operation of the computer system 800. In at least one embodiment, access from another component, such as the processor 810 and the peripheral interface 830, to the memory 820 may be controlled by the processor 810.

The peripheral interface 830 may couple an input device and/or an output device of the computer system 800 with the processor 810 and the memory 820. The processor 810 may perform a variety of functions for the computer system 800 and may process data by executing the software module and/or the instruction set stored on the memory 820.

The I/O subsystem 840 may couple various I/O peripheral devices with the peripheral interface 830. For example, the I/O subsystem 840 may include a controller for coupling a peripheral device, such as a monitor, a keyboard, a mouse, a printer, a touch screen and/or a sensor, etc., with the peripheral interface 830. According to another aspect, the I/O peripheral devices may be coupled with the peripheral interface 830 without using the I/O subsystem 840.

The power circuit 850 may supply power to all, or a portion, of components of a terminal. For example, the power circuit 850 may include a power management system, at least one power source such as a battery and alternating current (AC) circuit, a charge system, a power failure detection circuit, a power converter or inverter, a power status indicator, and/or other components for creating, managing and/or distributing the power.

The communication circuit 860 may enable communication with another computer system using at least one external port. Alternatively, as described above, the communication circuit 860 may enable communication with another computer system by including a radio frequency (RF) circuit, and thereby transmitting and receiving an RF signal known as an electromagnetic signal.

The at least one example embodiment of FIG. 8 is only an example of the computer system 800. The computer system 800 may have a configuration and/or an arrangement omitting a portion of the components illustrated in FIG. 8, further including components not illustrated in FIG. 8, or coupling two or more components. For example, a computer system for a communication terminal of a mobile environment may further include a touch screen, a sensor, and the like, in addition to the components of FIG. 8. A circuit for RF communication using a variety of communication methods, for example, wireless fidelity (WiFi), 3rd generation (3G), 4th generation (4G), 5th generation (5G) long term evolution (LTE), Bluetooth, near field communication (NFC), ZigBee, etc., may be included in the communication circuit 860. Components that may be included in the computer system 800 may be configured as hardware that includes one or more integrated circuits specified for at least one signal processing or application, software, or a combination of hardware and software.

The aforementioned word learning providing method may include further reduced operations or additional operations based on the description made above with reference to FIGS. 1 through 8. Also, at least two operations may be combined and order or locations of operations may be changed.

The methods according to some example embodiments may be configured in a form of a program instruction executable through a variety of computer systems and may be recorded on a non-transitory computer-readable medium.

For example, a program according to some example embodiments may be configured as a PC-based program or an application exclusive for a mobile terminal. Also, the methods according to some example embodiments may be performed in such a manner that a wordbook app controls the user terminal. The application may be installed on the user terminal through a file provided from a file distribution system. For example, the file distribution system may include a file transmitter (not shown) configured to transmit the file in response to a request from the user terminal.

According to some example embodiments, by simply receiving a selection on whether to maintain words to be learned in a learning list or whether to replace the words to be learned with other words, the learning list may be automatically updated and managed.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to some of the above-described example embodiments may be recorded in non-transitory computer-readable media including program instructions to implement various operations of some of the above-described example embodiments. The media may also include, alone or in combination with the program instructions, data files, data structures, and the like. The program instructions recorded on the media may be those specially designed and constructed for use in some example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The above-described devices may be configured to act as one or more software modules in order to perform the operations of some of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method to facilitate word learning, the method comprising:
   selecting, using at least one processor, a plurality of words to be learned;
   generating, using the at least one processor, a learning word pool including the plurality of words to be learned;
   evaluating, using the at least one processor, a grade of a user based on a learning result of a word of the plurality of words to be learned;
   updating, using the at least one processor, the learning word pool to include words of a difficulty level corresponding to the evaluated grade of the user;
   first synchronizing, using the at least one processor, the learning word pool with a plurality of other learning word pools on a plurality of devices in response to the update of the learning word pool, the first synchronizing including modifying each of the plurality of other learning word pools to include the words of the difficulty level corresponding to the evaluated grade of the user;
   selecting, using the at least one processor, a determined number of words from the learning word pool;
   generating, using the at least one processor, a learning list including the determined number of words;
   generating, using the at least one processor, a first screen on a display, the first screen including a first area, a second area and a third area, the first area of the first screen containing a first word included in the learning list;
   controlling, using the at least one processor, a hide state of the second area of the first screen by revealing or hiding first word information in response to a selection of the second area of the first screen, the first word information including a meaning of the first word;
   generating, using the at least one processor, a second screen on the display in response to a first selection of the third area of the first screen, the second screen including a first area, a second area and a third area, the first area of the second screen containing the first word;

generating, using the at least one processor, an updated first screen on the display by replacing the first word with a second word in the first area of the first screen in response to a second selection of the second area of the second screen or the third area of the second screen, the second word corresponding to a defined order of the plurality of words to be learned included in the learning list;

receiving, using the at least one processor, the first selection on the third area of the first screen, the first selection indicating whether to maintain the first word in the learning list or replace the first word with an alternate word;

first excluding, using the at least one processor, the first word from the learning list in response to the first selection to replace the first word;

determining, using the at least one processor, the alternate word from the learning word pool based on the alternate word and the first word having a same difficulty level;

adding, using the at least one processor, the alternate word to the learning list in response to the first excluding;

second synchronizing, using the at least one processor, the learning list with a plurality of other learning lists on a plurality of devices in response to the first excluding and the adding, the second synchronizing including modifying each of the plurality of other learning lists to exclude the first word and add the alternate word;

second excluding, using the at least one processor, the first word from the learning word pool in response to receiving the second selection of the second area of the second screen; and third synchronizing, using the at least one processor, the learning word pool with the plurality of other learning word pools in response to the second excluding, the third synchronizing including modifying each of the plurality of other learning word pools to exclude the first word, wherein the first excluding is performed without performing the second excluding in response to receiving the second selection of the third area of the second screen.

2. The method of claim 1, wherein the adding the alternate word to the learning list comprises determining, using the at least one processor, the alternate word to be added to the learning list from the learning word pool based on a previous learning history, a set learning difficulty level, or a difficulty level of a word of the plurality of words to be learned.

3. The method of claim 1, wherein the generating the learning word pool comprises determining, using the at least one processor, a word of the plurality of words to be learned from at least one of a push notification list including words to be memorized, a wordbook list including words retrieved from a dictionary, or words included in the dictionary.

4. The method of claim 3, wherein the generating the learning word pool comprises updating, using the at least one processor, the learning word pool in response to a modification in the push notification list, the wordbook list, or the dictionary, or at determined periods.

5. The method of claim 1, wherein the adding the alternate word to the learning list comprises:

receiving, using the at least one processor, the second selection indicating whether the first word that is to be excluded from the learning list has been memorized;

first recording, using the at least one processor, an indication that the first word has been memorized in response to the second selection that the first word has been memorized;

first replacing, using the at least one processor, the first word with the alternate word in response to the first recording;

second recording, using the at least one processor, an indication that the first word has not been memorized in response to the second selection that the first word has not been memorized; and second replacing, using the at least one processor, the first word with the alternate word in response to the second recording.

6. The method of claim 5, wherein the second replacing comprises:

excluding, using the at least one processor, from the learning list, the first word; and maintaining, using the at least one processor, the first word in the learning word pool.

7. The method of claim 5, wherein the second replacing comprises displaying, using the at least one processor, a push notification about the first word.

8. The method of claim 5, wherein the first replacing comprises excluding the first word from the learning list and the learning word pool.

9. The method of claim 1, further comprising:

displaying, using the at least one processor, the second word in response to the first selection to maintain the first word.

10. The method of claim 1, wherein the adding of the alternate word comprises displaying, using the at least one processor, a movement from the first screen to a second screen, the second screen including a corresponding area for receiving a second selection of whether the first word has been memorized.

11. A non-transitory computer-readable medium including instructions to control a computer system to facilitate word learning, wherein the instructions cause the computer system to perform a method comprising:

selecting a plurality of words to be learned;

generating a learning word pool including the plurality of words to be learned;

evaluating a grade of a user based on a learning result of a word of the plurality of words to be learned;

updating the learning word pool to include words of a difficulty level corresponding to the evaluated grade of the user;

first synchronizing the learning word pool with a plurality of other learning word pools on a plurality of devices in response to the update of the learning word pool, the first synchronizing including modifying each of the plurality of other learning word pools to include the words of the difficulty level corresponding to the evaluated grade of the user;

selecting a determined number of words among the learning word pool;

generating a learning list including the determined number of words;

generating a first screen on a display, the first screen including a first area, a second area and a third area, the first area of the first screen containing a word included in the learning list;

controlling a hide state of the second area of the first screen by revealing or hiding first word information in response to a selection of the second area of the first screen, the first word information including a meaning of the first word;

generating a second screen on the display in response to a first selection of the third area of the first screen, the second screen including a first area, a second area and a third area, the first area of the second screen containing the first word;

generating an updated first screen on the display by replacing the first word with a second word in the first area of the first screen in response to a second selection of the second area of the second screen or the third area of the second screen, the second word corresponding to a defined order of the plurality of words to be learned included in the learning list;

receiving the selection on the third area of the first screen, the selection indicating whether to maintain the word in the learning list or replace the word with an alternate word;

first excluding the word from the learning list in response to the selection to replace the word;

determining the alternate word from the learning word pool based on the alternate word and the first word having a same difficulty level;

adding the alternate word to the learning list in response to the first excluding;

second synchronizing the learning list with a plurality of other learning lists on a plurality of devices in response to the first excluding and the adding, the second synchronizing including modifying each of the plurality of other learning lists to exclude the word and add the alternate word;

second excluding the first word from the learning word pool in response to receiving the second selection of the second area of the second screen; and third synchronizing the learning word pool with the plurality of other learning word pools in response to the second excluding, the third synchronizing including modifying each of the plurality of other learning word pools to exclude the first word, wherein the first excluding is performed without performing the second excluding in response to receiving the second selection of the third area of the second screen.

12. A system for facilitating word learning comprising:
a learning word pool generator configured to
  select a plurality of words to be learned,
  generate a learning word pool including the plurality of words to be learned,
  evaluate a grade of a user based on a learning result of a word of the plurality of words to be learned,
  update the learning word pool to include words of a difficulty level corresponding to the evaluated grade of the user, and
  first synchronize the learning word pool with a plurality of other learning word pools on a plurality of devices in response to the update of the learning word pool, the first synchronization including modifying each of the plurality of other learning word pools to include the words of the difficulty level corresponding to the evaluated grade of the user;
a learning list generator configured to
  select a determined number of words from the learning word pool, and
  generate a learning list including the determined number of words;
a provider configured to
  generate a first screen on a display, the first screen including a first area, a second area and a third area, the first area of the first screen containing a first word included in the learning list,
  control a hide state of the second area of the first screen by revealing or hiding first word information in response to a selection of the second area of the first screen, the first word information including a meaning of the first word,
  generate a second screen on the display in response to a first selection of the third area of the first screen, the second screen including a first area, a second area and a third area, the first area of the second screen containing the first word, and
  generate an updated first screen on the display by replacing the first word with a second word in the first area of the first screen in response to a second selection of the second area of the second screen or the third area of the second screen, the second word corresponding to a defined order of the plurality of words to be learned included in the learning list; and
a learning list manager configured to
  receive the first selection on the third area of the first screen, the first selection indicating whether to maintain the first word in the learning list or replace the first word with an alternate word,
  first exclude the first word from the learning list in response to the first selection to replace the first word,
  determine the alternate word from the learning word pool based on the alternate word and the first word having a same difficulty level,
  add the alternate word to the learning list in response to the first exclusion,
  second synchronize the learning list with a plurality of other learning lists on a plurality of devices in response to the first exclusion and the addition, the second synchronization including modifying each of the plurality of other learning lists to exclude the first word and add the alternate word,
  second exclude the first word from the learning word pool in response to receiving the second selection of the second area of the second screen, and
  third synchronize the learning word pool with the plurality of other learning word pools in response to the second exclusion, the third synchronization including modifying each of the plurality of other learning word pools to exclude the first word,
  wherein the first exclusion is performed without performing the second exclusion in response to receiving the second selection of the third area of the second screen.

13. The system of claim 12, wherein the learning list manager is further configured to determine the alternate word to be added to the learning list from the learning word pool based on a previous learning history or a set learning difficulty level.

14. The system of claim 12, wherein the learning word pool generator is further configured to determine a word of the plurality of words to be learned from at least one of a push notification list including words to be memorized, a wordbook list including words retrieved from a dictionary, or words included in the dictionary.

15. The system of claim 14, wherein the learning word pool generator is further configured to update the learning word pool in response to a modification in the push notification list, the wordbook list, or the dictionary, or at determined periods.

16. The system of claim 12, wherein the learning list manager is further configured to display a push notification about the first word in response to the second selection that the first word has not been memorized.

17. The system of claim 12, wherein the provider is further configured to display the second word corresponding to the defined order of the plurality of words to be learned in response to the first selection to maintain the first word.

* * * * *